April 7, 1959 G. E. BANNING 2,881,338
VARIABLE SPEED ALTERNATING CURRENT MOTOR
Filed Nov. 18, 1953 3 Sheets-Sheet 1

INVENTOR.
Gerald E. Banning
BY
Winston E. Miller
ATTORNEY

April 7, 1959     G. E. BANNING     2,881,338
VARIABLE SPEED ALTERNATING CURRENT MOTOR
Filed Nov. 18, 1953     3 Sheets-Sheet 2
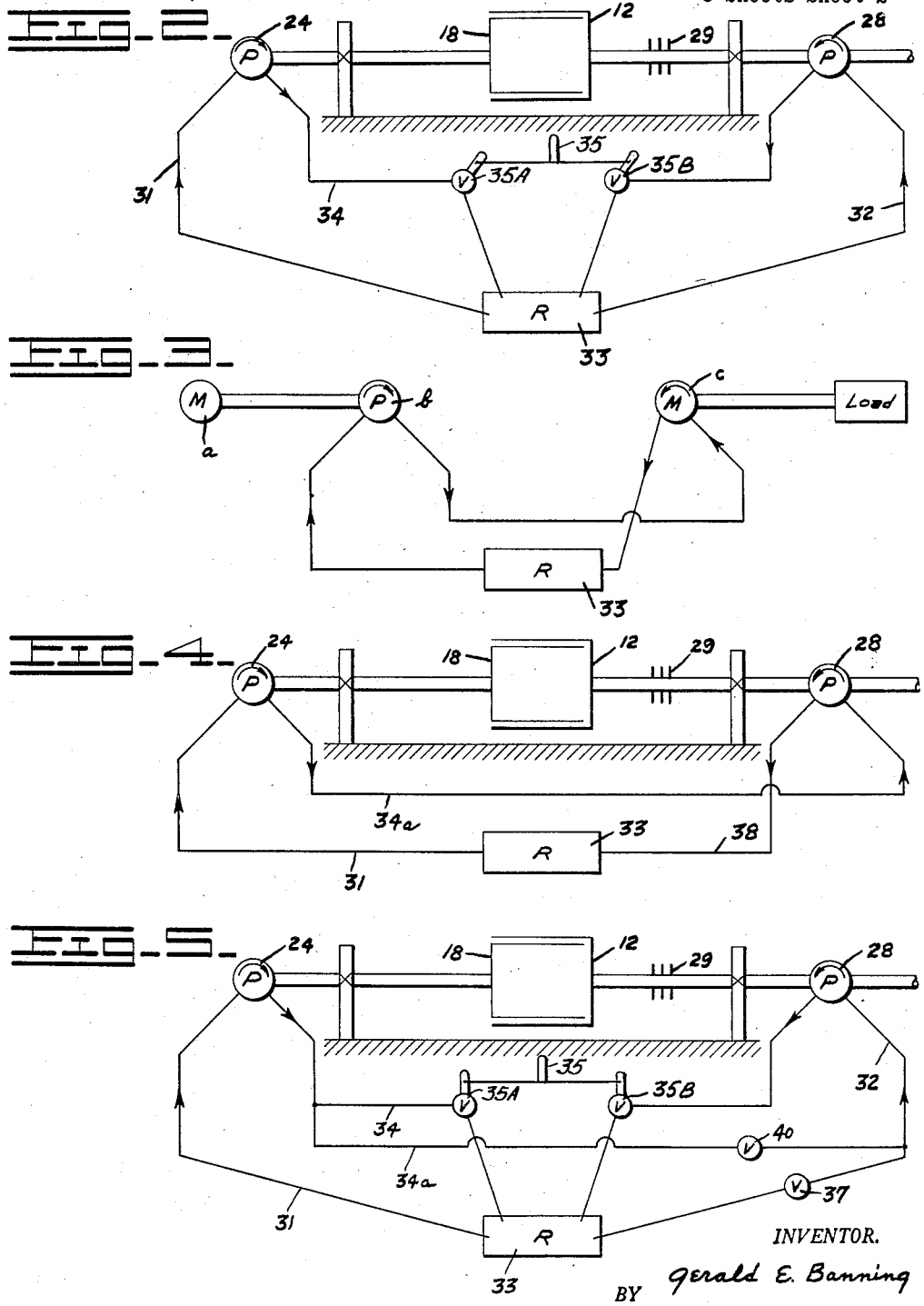
INVENTOR.
BY Gerald E. Banning
Winston E. Miller
ATTORNEY April 7, 1959
G. E. BANNING
2,881,338
VARIABLE SPEED ALTERNATING CURRENT MOTOR
Filed Nov. 18, 1953
3 Sheets-Sheet 3
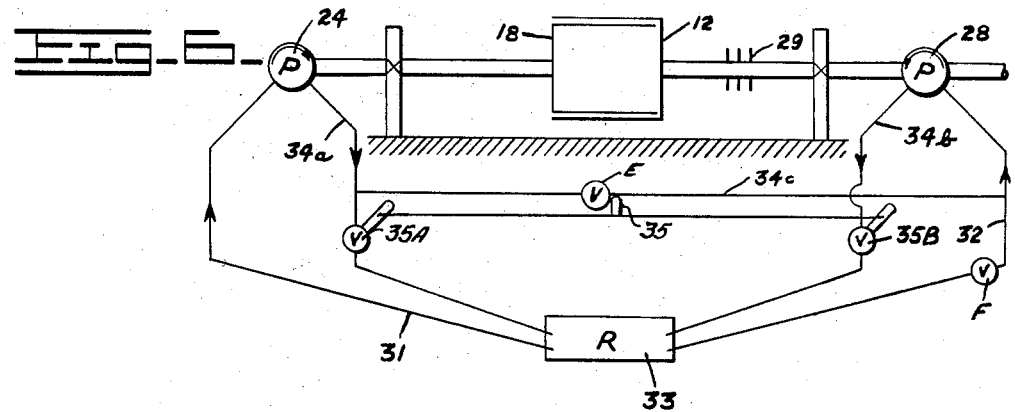
INVENTOR
BY *Gerald E. Banning*
*Winston E. Miller*
ATTORNEY United States Patent Office 2,881,338
Patented Apr. 7, 1959

2,881,338

VARIABLE SPEED ALTERNATING CURRENT MOTOR

Gerald E. Banning, Saginaw, Mich., assignor to Banning Electrical Products Corporation, Saginaw, Mich., a corporation of Michigan Application November 18, 1953, Serial No. 392,913

2 Claims. (Cl. 310—119)

This invention relates generally to new and useful improvements in electric motors and more particularly to a hydraulically controlled motor that is designed with the simplicity of a standard Squirrel-Cage, three-phase motor, and that has dual pumps, each of which is attached to a rotating stator and a rotating rotor. It is specifically intended as an improvement over the conventional variable speed A.C. slip-ring motor which operates on the principle of free rotation or "slip" of the rotor about a stationary stator.

The standard variable speed motor by its very nature requires expensive drive control mechanism, absorption units, wound rotors, and so forth in order to operate efficiently. It is my objective to eliminate the need for these items and develop instead an inexpensive prime mover, hereinafter more fully described below, that utilizes hydraulic and electrical reactions and produces a higher efficiency of performance with infinite speed control regardless of load or no-load on the output shaft, or sudden load fluctuations.

Therefore, a prime object of the present invention is the provision of means whereby a motor having these and other characteristics may be inexpensively manufactured, quickly assembled, and easily maintained by those skilled in the art.

Another object of the invention is the provision of means whereby over fifty percent of the heat loss of the conventional variable speed A.C. slip-ring motor is entirely eliminated, a condition resulting from the counter-electromotive forces of the rotor that maintains the motor's electrical characteristics and output at highest efficiency.

Another object of the invention is the provision of a motor having hydraulic qualities and a motor which will operate efficiently with small quantities of liquid.

A further object of the invention is the provision of a motor which is satisfactorily ventilated at slower speeds and which does not require long-duration starting or reversing current.

Another object of the invention is the provision of a motor having positive acceleration and deceleration controls, and a motor which is contained in the same frame size as a high-speed conventional motor of the same horsepower.

Other objects and purposes of this invention will become apparent to persons familiar with this type of equipment upon reference to the accompanying drawings and upon reading the following specification.

In meeting the above objects and purposes, as well as others incidental thereto and associated therewith, I have utilized the combination of a revolvable stator connected with a gear pump, and a revolvable rotor connected with a second gear pump, and have created means for controlling their respective movements so as to provide greatly increased torque on the output shaft.

The invention accordingly comprises the elements, features of construction, and arrangement of parts which will be exemplified in the structures hereinafter described, and the scope of the application of which will be indicated in the following claims.

For illustration of a preferred embodiment of the invention, attention is directed to the accompanying drawings in which:

Figure 2 is a schematic layout of the constant torque design of the improved motor;

Figure 3 is a revised embodiment of two motors and a hydraulic system;

Figure 4 is a schematic layout of the constant horsepower design of the improved motor;

Figure 5 is a schematic layout of the tapered horsepower design of the improved motor; and Figure 6 is a schematic layout of the improved motor for purposes of explaining the principle of combining electric and hydraulic energies.

Figure 1:
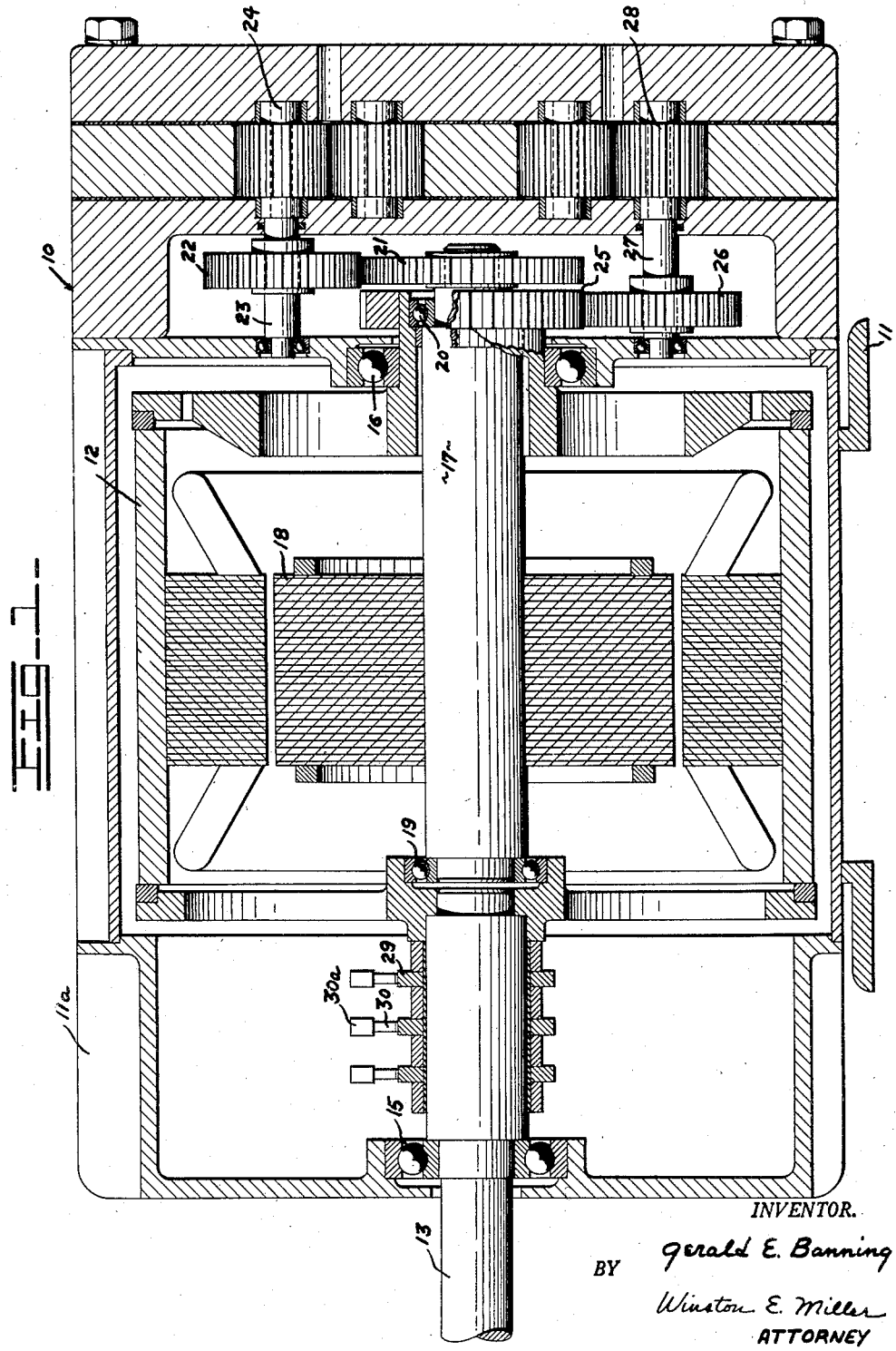
Figure 1 is a longitudinal sectional view of the improved motor.

Referring now to the drawings, wherein like numerals designate like parts, I have provided a motor housing 10 of elongated cylindrical shape having base supports 11 and outwardly flaring fins 11a about its periphery. A stator 12 is centrally positioned in said housing and is attached to the output shaft 13 adjacent one end of said shaft. The stator is constructed of steel laminations that are wound with insulated copper wire for a definite number of magnetic poles and these laminations are firmly keyed in position. Bearing assemblies 15 and 16 are provided in the motor housing and disposed therein are one end of the output shaft and the opposite end of the stator, said bearing assemblies providing supporting means and enabling revolution of the stator unit therein. Adjacent said output shaft and coaxially aligned therewith is a rotor shaft 17 having a steel laminated rotor assembly 18 attached thereto. The rotor and rotor shaft are supported by bearings 19 and 20 and one end of the rotor shaft has a gear 21 mounted thereon. A gear 22 is mounted on the shaft 23 of the pump 24, said gear having teeth which mesh with teeth on the gear 21, so as to cause rotation of the pump shaft and thereby actuate the pump in response to movement of the rotor shaft.

Adjacent the gear 21 and centrally disposed on one end of the stator is a gear 25, the teeth of said gear engaging the teeth of a gear 26 mounted on the shaft 27 of the pump 28 so as to cause corresponding movement of the shaft 27 and actuation of the pump 28 in response to movement of the stator.

The numeral 29 denotes collector rings. The brushes 30 are supported by the brush holders 30a and engage said collector rings. The fluid reservoir is indicated by the numeral 33 and is further designated R.

*Operation*

In the following description of the operation of the motor, reference will be made to both the mechanical and hydraulic features and all necessary ramifications thereof.

In the embodiments shown, two elements are combined together to the load on the output shaft, one in the form of electrical running torque and the other in the form of liquid pressure. As recognized by those skilled in the art, electrical energy cannot be stored and then used in the form of power over an infinite period of time. With this in mind, I have utilized oil in my variable speed motor since oil pressure may be used and compounded with electrical energy to produce high efficiency, greatly increased torques and reduced current.

To reiterate, the invention described herein comprises a polyphase-wound stator which is free to rotate, and a Squirrel-Cage rotor which is also free to rotate. The torque reaction which appears between the stator frame and the earth in a conventional motor is used to control the output characteristics of the motor through the use of hydraulic controls.

As the torque produced by an induction motor represents a force directed by the rotor to the load, there must be an equal and opposite force or reaction present to balance this torque. In a conventional motor this torque reaction appears between the stator frame and the earth to which the frame is attached. Since the stator frame is mechanically fixed to the earth, there is no possible method of utilizing this reaction to control the motor.

If it is assumed that the stator and stator frame are disengaged from the earth and mounted on bearings, and that the stator is free to rotate and energized, and that there is no load on the motor, the rotating magnetic field set up in the stator windings will create a torque on the rotor. There must be an equal and opposite torque created on the stator and since both the stator and the rotor are free to rotate, each will accelerate in opposite directions until the relative speed between the two is approximately equal to synchronous speed. Neglecting friction, the speed of each member with respect to the earth will be approximately one-half synchronous speed. The rotor will rotate in the direction of the magnetic field and the stator will rotate in an opposite direction. It is obvious that the motor discussed above would be worthless in a practical sense, but if it be assumed that an adjustable braking device were coupled to the stator shaft and adjusted to prevent the stator from turning, the motor would operate as a conventional A.C. Squirrel-Cage induction motor with the important exception that the torque reaction, or point of pry, now appears at the braking device instead of between the stator frame and the earth. The power demanded by the load is supplied by the line current and is proportional to the slip.

If the braking device were partially released there would be less resistance to the rotation of the stator, causing the stator to rotate in an opposite direction to the rotor and tending to increase the relative speed between the rotor and the stator. This causes the rotor to decelerate until the relative speed again reaches synchronous speed minus slip. The stator will accelerate until the torque reaction developed by the braking device again balances the torque required by the load. The rotor speed will now be equal to synchronous speed minus slip and stator speed, and the power supplied by the motor will be that required by the load at this reduced speed.

With reference to the four-pole motor indicated in Figure 6, and to further simplify the explanation of combining electrical and hydraulic energy, let it be assumed that the load on the output shaft is forty foot pounds, and that the valves E and F are closed. When energized with electric current a magnetic field in the stator will cause the rotor to revolve at synchronous speed of 1800 r.p.m. On closure of the valve 35A pumping action of the pump 24 will stop, causing the rotor to stop and the stator to revolve in an opposite direction. Fluid pressure of twenty pounds has therefore been transferred to electrical running torque on the output shaft. Moreover, like fluid pressure still exists in line 34a between the discharge side of the pump 24 and the valve 35A. By opening the valve E this fluid pressure escapes through the line 34c and enters the pump 28. At this instant an additional torque of twenty foot pounds has been added and electrical and hydraulic energy have been effectively combined together to the same load.

As soon as the load moves, the stator will likewise change its position with respect to the rotor. The rotor will revolve, driving the pump 24, which in turn continues to transmit fluid pressure to the pump 28. As such, the pump 28 is now converted to a hydraulic motor and will continue this operation until reaching one-half synchronous speed or 900 r.p.m.

Referring now to Figure 2 wherein is illustrated diagrammatically further hydraulic relationship to the motor, the pumps 24 and 28 are of the same size and displacement and the stator is engaged so as to drive the load. The motor will operate in the conventional manner except that the load will now rotate in an opposite direction to that of the rotating magnetic field. In practical applications of the motor, the output shaft is usually coupled to the stator, particularly in applications requiring slow output speed and therefore, the rotor, which is revolving at high speed, has less inertia and is easier to control. Any tendency for the rotor and the stator to become over-synchronous during starting will keep the starting currents at a minimum, and experimentation has indicated that starting currents are less than three-hundred percent of rated current as compared to four-hundred fifty through seven-hundred percent of rated current for the conventional A.C. Squirrel-Cage induction motor.

The pump 28 is coupled to the stator or load shaft and will act as a governor, whereas the pump 24 which provides the torque reaction, is coupled to the rotor shaft. The control 35 is arranged so it will close the discharge of the pump 28 as it opens the discharge of the pump 24 (and vice-versa).

Assuming for purposes of illustration, that the stator is energized and the valve 35A on the discharge side of the pump 24 is open, and the valve 35B on the discharge side of the pump 28 is closed, the rotor will accelerate under no-load conditions until it reaches no-load speed. The stator and load will remain stationary since they are held by the load and the pump 28.

If the control 35 is now adjusted so as to partially close the discharge of the pump 24 and to partially open the discharge of the pump 28, fluid pressure is proportionately developed in the line 34 between the pump 24 and the valve 35A. This fluid pressure results in a torque reaction which causes the stator to accelerate the load and the pump 28. However, in the above illustration the running speed of the output shaft will be determined not only by the pressure developed by the pump 24, but also by the pressure developed by the pump 28.

The total power developed by the motor is now divided into two parts—the power supplied to the load and the power supplied to the pump 28. Under normal operating conditions, and with a constant torque load, the power supplied to the pump 28 is very small as compared to the total power and therefore, most of the power is transmitted to the load. By varying the control 35 from its fully opened position to its fully closed position with respect to the pump 24, an infinite variable speed is available on the load shaft.

If the load suddenly demands less power the stator will tend to speed up, thereby driving the pump 28 faster. On the other hand, the rotor will tend to slow down and thereby create less torque reaction for the load. As the pump 28 now tends to produce a greater pressure, it absorbs a greater proportion of the total available output power and less power is supplied to the load. In order to produce this effect there is very little change in the speed of the output shaft during the load fluctuation.

If the load suddenly demands more power, the stator will tend to slow down and therefore drive the pump 28 slower. The rotor will speed up and create a greater torque reaction for the load. As the pump 28 now tends to produce less pressure, it now absorbs a smaller proportion of the total available output power and more power is supplied to the load.

Therefore, any increase or decrease in load tends to be balanced by the action of the pump 28. This tends to keep the output shaft speed constant and also tends to keep the motor unaware of the load fluctuations. In this manner, no sizable line currents are produced during these fluctuations.

The pump 28 will also act as a brake on the motor.

If the motor is deenergized it will prevent the load from "running away," and if the load is suddenly released the pump 28 will prevent the motor from "running away." Furthermore, the motor will maintain constant speed independent of the load because of this protective feature inherent in the motor itself.

Assuming the motor as set for operation at half-speed and with fluid pressure balanced in the line 34, the rotor pump 24 would be revolving at the same r.p.m. but in the opposite direction to the stator pump. If a shock load is forced upon the revolving stator at this designated setting, fluid pressure will immediately increase because of reactance in the rotor pump, thereby slowing rotation of the rotor and correspondingly increasing the speed of the stator.

If the shock load is greater than the running torque of the motor, an automatic balancing valve (not shown) is adapted to compensate and maintain the r.p.m. of the output shaft at its predetermined setting.

As aforementioned, the motor will effect sudden and immediate acceleration and deceleration and is highly appropriate for use with cranes and the like, wherein positive control of loading is essential.

Referring to Figure 3, I have provided a variable positive displacement pump $b$ driving a variable positive displacement hydraulic motor. If the relative displacements of the pump $b$ and the motor $a$ are made equal, the pump $b$ will supply a definite quantity of fluid to the hydraulic motor $c$, and as the motor $c$ has the same displacement as the pump $b$, the motor will turn at the same speed. Friction and pump losses being at a minimum, all of the power developed by the motor $a$ is transmitted to the load. Therefore, as both the pump $b$ and the motor $c$ must rotate at the same speed, the torque on the shaft driving pump $b$ and the motor $c$ must equal the torque developed by the motor $c$.

Assuming now for illustrative purposes that the displacement of the motor $c$ is changed so that it has five times the displacement of the pump $b$, as the pump $b$ is supplying the same quantity of fluid as before and the motor $c$ now requires five times as much fluid to make one revolution, the motor $c$ will now turn at one-fifth the speed of the pump $b$. Also, as all the power is still being transmitted to the load, the motor $c$ will now develop five times the torque it developed when the displacements were equal.

Inasmuch as this principle is true for any ratio of displacements between the pump $b$ and the motor $c$, the motor $c$ will therefore act as a constant horsepower hydraulic motor.

Referring to Figure 4, the constant horsepower principle has been applied to the motor and I have again indicated the stator as driving the load. When the collector rings receive electrical current, a torque is developed between the rotor and the stator and they will commence to rotate in opposite directions. Assuming that the pump 28 has five times the displacement of the pump 24, and that the motor is wound for 1800 r.p.m. synchronous speed, as the rotor accelerates it drives the pump 24, which in turn transmits fluid through the line 34a to the pump 28, and drives the pump as a hydraulic motor. The pump 28 now aids the stator in accelerating the load and since it has five times the displacement of the pump 24, it will rotate at one-fifth the speed of the pump 24 and thereby supply five times the torque which is driving the pump 28 to the load. The torque driving pump 24 also appears as a reaction torque to the stator, causing the stator to supply this torque to the load in addition to the torque supplied by the pump 28. Therefore, the load is being supplied with six times the torque developed by the induction motor, and electrical and hydraulic energy have been combined together. Since the pump 28 is rotating at only one-fifth the speed of the pump 24, the speed of the output shaft will be approximately 300 r.p.m. As the relative speed between the rotor and the stator is approximately 1800 r.p.m., and the stator is revolving at one-fifth the speed of the rotor, the stator will revolve at approximately 300 r.p.m. and the rotor will revolve at approximately 1500 r.p.m.

Therefore, the motor torque reaction has been used in such manner that it appears the motor is supplying rated torque at rated speed, or approximately 1800 r.p.m.; whereas, with respect to the earth, the output shaft is supplying six-times rated torque at one-sixth rated speed.

When the motor is started under load the pump 24 will develop considerable pressure to drive the pump 28, which will also appear as a torque reaction to the motor. This combination of electrical and hydraulic energy causes the load to be accelerated very rapidly and since the oversynchronous effect of the rotor and the stator keeps the starting currents at a minimum, the motor is ideally suited for applications requiring high acceleration rates.

By using infinitely variable positive displacement pumps it is therefore possible to achieve an infinitely variable speed, constant horsepower polyphase A.C. motor by simply varying the displacement ratio between the respective pumps. The low speed of a four-pole motor, using this principle, is approximately 100 r.p.m. and also, by using pumps of fixed but different displacements it is possible to put a slow speed A.C. squirrel-cage induction motor in the same frame size of a high speed induction motor of the same horsepower. Nor is it necessary to use high speed motors with gear reducers for slow speed applications.

Heretofore, I have indicated two methods of using reaction to control an A.C. squirrel-cage induction motor; one method producing constant torque, the other producing constant horsepower. If these methods are combined with proper controls (Figure 5), tapered horsepower can be achieved.

The term "tapered horsepower" as used herein is used in the same sense as with the conventional D.C. shunt motor and indicates variable speed, constant torque over part of the motor speed range, and variable speed, constant horsepower over part of the motor speed range.

In Figure 5, the rotor is coupled to a variable positive displacement pump 24 and the stator is coupled to the variable positive displacement pump 28 and to the load. The control 35 is arranged so it will close the valve 35B and the discharge side of the pump 28, as it opens the valve 35A and the discharge side of the pump 24 (and vice-versa). The valve 40 is designed to be either fully opened or fully closed.

It will appear obvious to those skilled in the art that this motor can have the characteristics of either constant torque or constant horsepower, and at different times in an operating cycle.

Over the speed range that a constant torque is required the valve 40 is fully closed, and the motor will act as a constant torque motor. The control 35 will adjust the valves 35A and 35B and the output speed and torque of the motor. The displacements of the pumps are held constant.

When a constant horsepower characteristic is desired the control 35 is adjusted so as to close the valve 35A on the discharge side of the pump 24 and open the valve 35B on the discharge side of the pump 28. The valve 40 is fully opened and allows the discharge side of the pump 24 to enter the intake side of the pump 28, whereas closing the valve 37 prevents fluid from entering the reservoir. The motor will now act as a constant horsepower motor and the output shaft is controlled by varying the displacement ratio between the pump 24 and the pump 28. Therefore, rated horsepower will be developed at every speed of the motor.

Various controls may be added to the hydraulic system to give the motor any characteristic demanded by the particular application. The valves, reservoir and pumps can be positioned in the end bells of the motor and if desired the control valves may be pilot operated from a remote control panel, thereby giving maximum flexibility to the control system. Also, I wish to indicate that the generic term "magnetic elements" refers to both the rotor and the stator, since under substantially all conditions they perform interchangeable functions.

As indicated in Figure 1, the motor has been constructed in a totally enclosed casing and is dust and moisture proof without requiring elaborate cooling devices. If desired for any particular application hydraulic fluid may be disposed inside the motor casing, and for highest performance efficiency it is advisable to maintain the fluid level not higher than the center of the rotor or stator shafts since a higher fluid level tends to develop greater friction loss. By use of a solid plate stator additional friction loss is kept at a minimum. In order to further counteract fluid resistance and resulting friction loss, an aluminum cover may be positioned over the stator windings and the collector rings may be grooved.

While I have illustrated and described a particular embodiment of the invention, modifications thereof will occur to those skilled in the art. I desire it to be understood, therefore, that my invention is not to be limited to the particular arrangements disclosed, and I intend in the appended claims to cover all modifications which do not depart from the spirit and scope of the invention.

I claim:

1. In an apparatus for maintaining variable speed and increasing torque on the output shaft of an electric motor, a housing, a first magnetic element within said housing, a first shaft axially disposed in said magnetic element and rotatably mounted in said housing, a telescoping second magnetic element adapted to revolve about said first magnetic element, a second shaft coaxially disposed with said first shaft, said second shaft firmly connected to said second magnetic element and rotatable therewith, collector rings in said housing in telescoping engagement with said second shaft for conducting electric power to the second magnetic element, a first pump in engagement with said first shaft, a second pump motor connected to said second magnetic element, a fluid reservoir, a first line connecting said reservoir and the intake side of said first pump, a second line connecting said reservoir and the discharge side of said first pump, a third line connecting said reservoir and the intake side of said second pump motor, a fourth line connecting said reservoir and the discharge side of said second pump motor, a fifth line connecting said second line and said third line, a first valve in said second line between said fifth line connection and said reservoir, a second valve in said fifth line, a third valve in said third line between said fifth line connection and said reservoir, means for delivering electrical current to said collector rings, means whereby electrical reaction torque and hydraulic torque are together imparted to said second shaft by closing said first and second valves and stopping said first magnetic element, and opening said second valve and closing said third valve, substantially as set forth.

2. In an apparatus for increasing the torque capacity of a motor, a rotor member, a revolvable stator member, a first shaft connecting with the rotor member, an output shaft connected with the stator member, collector rings on one of said members and means for imparting electrical current thereto, a pair of fluid pumps each including a fluid intake line and a fluid discharge line, the first pump operated from the first shaft and the second pump motor operated from the output shaft, a reservoir in connection with said intake and said discharge line, a valve operative into the fluid discharge line of said first pump for controlling the operation of the first pump and hereby controlling the speed of the rotor member, a second valve operative into the fluid discharge line of said second pump motor for controlling the operation of the second pump motor and thereby the speed of the stator member, a third valve in the intake of said second pump motor, the improvement which comprises connecting the fluid discharge line of the first pump including a fourth valve for checking the operation thereof, whereby upon shutting said first valve and stopping said rotor member a reaction torque is developed on said output shaft, and upon opening said fourth valve and closing said third valve an additional torque is developed on said output shaft, substantially as set forth.

References Cited in the file of this patent

UNITED STATES PATENTS

| | | |
|---|---|---|
| 711,663 | Herdman | Oct. 21, 1902 |
| 899,189 | Sahulka | Sept. 22, 1908 |
| 913,757 | McLeod | Mar. 2, 1909 |
| 2,249,671 | Skowron | July 15, 1941 |